March 19, 1963 D. H. BERGQUIST 3,082,098
METHOD OF PREPARING POWDERED EGG ALBUMEN
Filed July 15, 1955 2 Sheets-Sheet 1
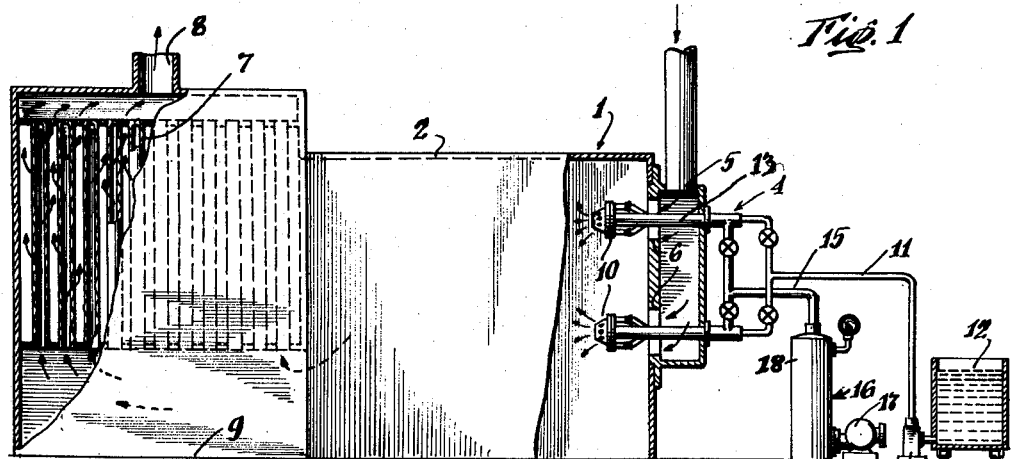
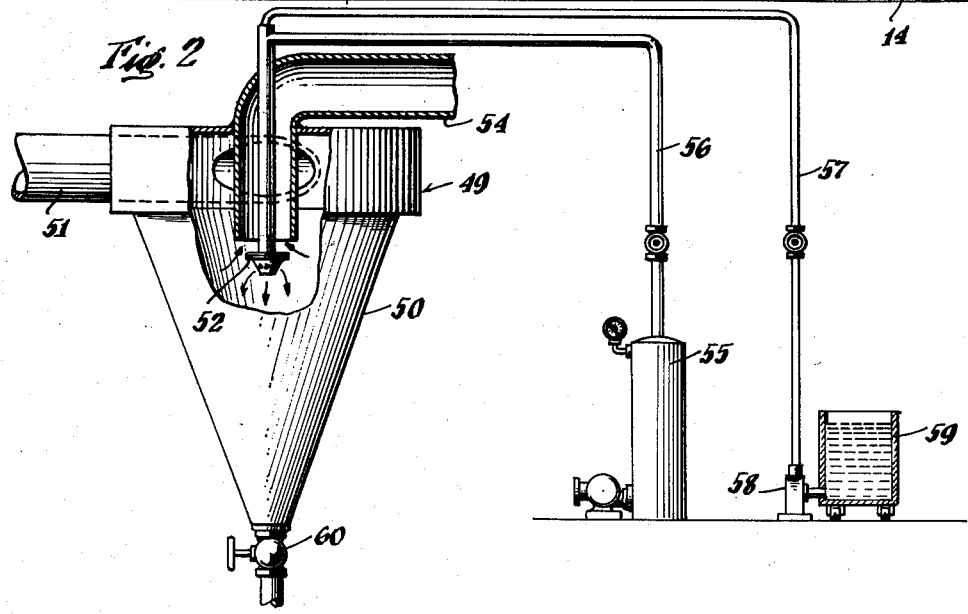
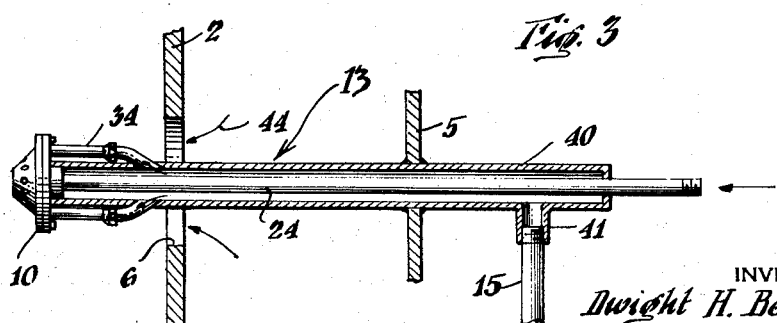
INVENTOR
Dwight H. Bergquist
BY
Norman Holland
ATTORNEY March 19, 1963
D. H. BERGQUIST
3,082,098
METHOD OF PREPARING POWDERED EGG ALBUMEN
Filed July 15, 1955
2 Sheets-Sheet 2
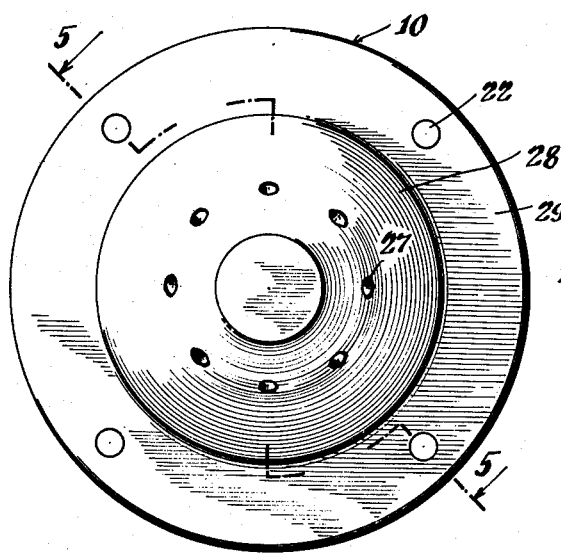
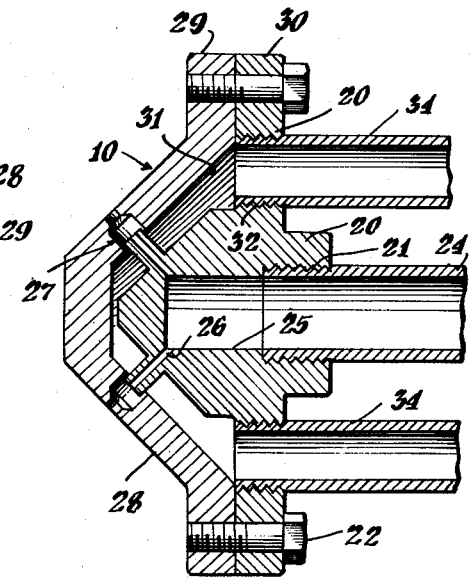
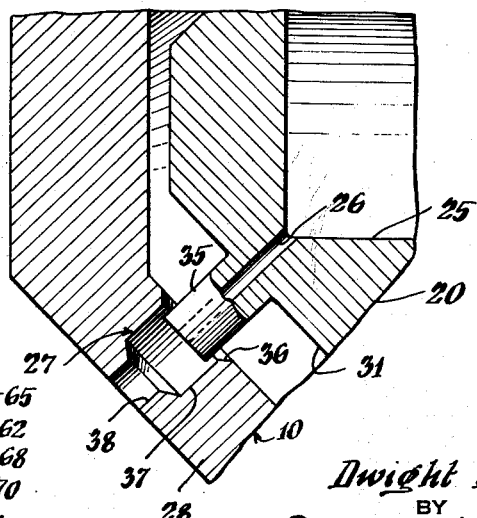
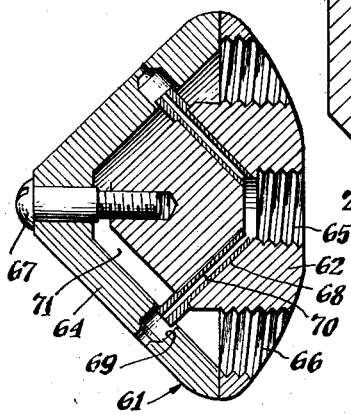
INVENTOR
Dwight H. Bergquist
BY
Norman N. Holland
ATTORNEY

United States Patent Office 3,082,098
Patented Mar. 19, 1963

3,082,098
METHOD OF PREPARING POWDERED EGG ALBUMEN
Dwight H. Bergquist, Springfield, Mo., assignor to Henningsen, Inc., New York, N.Y., a corporation of Texas
Filed July 15, 1955, Ser. No. 522,336
5 Claims. (Cl. 99—210)

The present invention relates to spray drying and more particularly to an improved method for the spray drying of liquid products, such as food products.

Many food products which are normally distributed and sold in a liquid state have been found to be advantageously stored and distributed in a powdered or dehydrated form. Such products as egg whites, whole eggs, egg yolks, milk and many others are now dehydrated and distributed in powdered form.

Presently known methods of dehydrating such products utilize atomizing devices which spray the fluids into a stream of hot gas. The hot gas dehydrates the spray droplets and the remaining solids are precipitated as a dry powder.

It has been found that the known methods of dehydration have in many instances changed the characteristics of the products in undesirable ways. Known types of spray driers use conventional atomizing devices such as high-pressure nozzles and centrifugal atomizers which subject the liquid product to considerable homogenizing or shearing action as the liquid product passes therethrough. The present invention provides an improved spray drier which reduces the homogenizing or shearing action and produces a dried product which retains the original characteristics of the liquid product.

One example of the change in functional properties of spray dried products occurs in egg white dehydrated by conventional atomizing devices. A serious loss in the beating power of the egg white occurs so that whipping times in baking with the egg white are necessarily greatly lengthened and a significant reduction in cake volume occurs in cakes prepared with the egg white. It is believed that this damage to the egg white is caused by the shear stresses in the liquid egg white existing during its spraying by conventional pressure nozzles and centrifugal atomizers.

Accordingly, an object of the invention is to provide an improved method for spray drying.

Another object of the present invention is to provide an improved spray-dried product.

Another object of the present invention is to provide improved spray-dried egg albumen.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic view of one embodiment of the spray drier of the invention;

FIG. 2 is a diagrammatic view of another embodiment of the spray drier of the invention;

FIG. 3 is a side elevational view, partially in section, of an atomizer connection in accordance with the invention;

FIG. 4 is a front elevational view of the atomizer of the invention;

FIG. 5 is a sectional view taken along the line 5—5 of FIG. 4;

FIG. 6 is a fragmentary, enlarged sectional view of a nozzle of the atomizer of FIG. 4; and FIG. 7 is a sectional view of another embodiment of the atomizer.

Referring to the drawing and particularly to FIG. 1, a spray drier 1 is shown having a conventional enclosed drying chamber 2 into which the liquid product is sprayed for drying by the novel atomizer system 4 of this invention. A hot gas, such as hot air, is forced into drying chamber 2 from a suitable supply conduit 5 through hot gas inlets 6 in the wall of drying chamber 2 adjacent atomizer system 4. The hot gas dehydrates the spray droplets emerging from atomizer 4 and carries the evaporated portion out of chamber 2 through filter bags 7 and outlet 8. The solid portions of the droplets fall downwardly as a powder onto the floor 9 of drying chamber 2 for removal.

In order to heat the spray droplets to a predetermined temperature during their dehydration, the hot air from conduit 5 is supplied at a high temperature to rapidly heat the droplets and to overcome the evaporative cooling effect of the dehydration. Thus, for example, where egg white is being dried, the hot air has a temperature of about 350 degrees F. in order to heat the droplets to a temperature of about 110 degrees F.

The two fluid atomizer system 4 replaces conventional pressure nozzle and centrifugal atomizer systems and comprises atomizers 10, atomizer connector 13 on which the atomizer 10 is mounted, fluid supply piping 11 which connects the atomizer connector 13 to a source of the liquid product 12 through a pump 14, and gas piping 15 which connects the atomizer connector 13 to a source of gas 16. The source of gas in the embodiment shown in FIG. 1 comprises a suitable air compressor 17 and a storage tank 18 capable of supplying air to the atomizer 10 at a constant and predetermined pressure. Gases other than air may be used when suitable.

The details of a preferred form of the atomizer connector 13 are shown in FIG. 3. The atomizer connector 13 comprises central liquid conduit 24 adapted for threaded connection at one end to atomizer 10 and at its other end to fluid supply piping 11 and an air jacket 40 disposed coaxially about liquid conduit 24 and adapted to receive air through inlet 41 and to transmit it to atomizer 10 through atomizer connecting tubes 34. The air jacket 40 performs the dual function of supplying air to atomizer 10 and of shielding the liquid product in central liquid conduit 24 from the warm drying air 44 being directed past atomizer 10 from conduit 5. As noted above, the drying air 44 may have a temperature of about 350 degrees F. to raise the spray droplets to 110 degrees F. The 350-degree F. temperature is harmful to most food products and they cannot be subjected to it while passing through the central liquid conduit 24. The air or other gas flowing through air jacket 40 insulates the central liquid conduit, keeping it relatively cool to prevent overheating of the liquid product which would damage it as well as coagulating many food products.

In order to provide for a high-capacity spray drier, it is necessary to provide a liquid spray which occupies a substantial part of the interior of drying chamber 2 and which thus presents a maximum number of spray droplets to the vaporizing action of the heated gas entering drying chamber 2 through hot gas inlets 6. Two types of atomizing devices are presently used to provide the widely distributed spray. One of these is a pressure nozzle and the other is a centrifugal atomizer. The pressure nozzles which are operated at pressures of a thousand p.s.i. or more and the centrifugal atomizers both subject the liquid product to shear forces great enough in many cases to cause a denaturation of the liquid product. The two fluid atomizer 10 of the present invention provides a widely dispersed spray and it operates at low pressures of considerably less than 100 p.s.i., as will be described below, which subject the liquid product to negligible shear forces during the atomization.

A preferred form of low-pressure two-fluid atomizer 10 is shown in detail in FIGS. 4 through 6.

Atomizer 10 comprises a hollow, generally conically shaped nozzle face plate 28 fastened to a fluid inlet plate 20 by bolts 22. Nozzle face plate 28 is spaced from inlet plate 20 to provide an enclosed fluid distributing chamber 31 which distributes the atomizing fluid from inlets 34 to the plurality of nozzles 27 located on the sides of nozzle face plate 28. The atomizing fluid is normally a gas and in the usual case may be air. The fluid to be atomized is admitted through fluid inlet 24 into a central conduit 25 in inlet plate 20 and thence to the nozzles 27 through conduits 26 in inlet plate 20 and nipples 35 formed on the inner face of inlet plate 20. Nozzles 27 are spaced around the conical surface of nozzle face plate 28 so that they spray the atomized fluid in a diverging pattern. By using a plurality of nozzles 27 rather than a single nozzle, the nozzles may be made smaller for a given rate of fluid flow, resulting in better control of the atomized particle size. The smaller nozzles form uniformly sized particles of a predetermined size while large nozzles form particles of varying sizes. In order to provide uniform spray drying conditions, the control of the particle size is very important as the temperatures and drying times of the particles which depend on the particle size are preferably maintained at uniform and predetermined amounts.

The details of the nozzle 27 are shown in FIG. 6. Duct 26 in nipple 35 carries the fluid product to be atomized from conduit 25 across the distributing chamber 31 to nozzle 27. An annularly-shaped opening 36 is left between nipple 35 and the nozzle face 28 to provide a passage into nozzle 27 for the atomizing fluid from chamber 31. The atomizing fluid and the fluid product are mixed in mixing chamber 37 to form the spray droplets. Restricted portion 38 directs the spray formed in mixing chamber 37 outwardly into the drying chamber 2.

The liquid product to be atomized is supplied to atomizer 10 with the minimum pressure which will insure equal distribution of the product to the nozzles. A pressure of as little as six or seven pounds per square inch has been found suitable. The pressure of the atomizing fluid, such as air, is kept as low as possible to prevent shear stresses in the formation of the droplets, since the shear forces cause denaturation of the product, as discussed above. Using a gas such as air, pressures of from 7 to 15 p.s.i. have been found sufficient to form spray droplets of satisfactory size for spray drying of products such as egg whites, egg yolks or whole eggs as contrasted with the conventional pressures of a thousand pounds or more per square inch. Pressures of the order of 100 pounds per square inch or less will be referred to herein including the claims as relatively low pressures, while those of a thousand pounds per square inch or more will be referred to as relatively high pressures.

Another embodiment of the two fluid atomizer is shown in FIG. 7 which is used for liquid products which have a tendency to cake on portions of the atomizer shielded from the drying air stream. This atomizer 61 is generally similar to the atomizer of FIGS. 4 and 5, however it has a streamlined cross section with rounded edges to allow a smooth flow of the spray drying gas over it and to eliminate low pressure areas on the atomizer face at which the atomized particles tend to adhere and collect. The atomizer 61 has a face plate 64 attached to an inlet plate 62 by a single centrally located bolt 67. Both face plate 64 and inlet plate 62 have smoothly rounded edges. A fluid distributing chamber 71 is formed between face plate 64 and inlet plate 62 to distribute the atomizing fluid from inlets 66 to nozzles 69. Conduits 70 in nipples 68 conduct the product to be atomized from inlet 65 in inlet plate 62 to nozzles 69.

The two-fluid atomizer is shown in FIG. 2 installed vertically in a conical drier 49. Hot gas enters the conical drying chamber 50 through gas supply pipe 51 at its edge so that the hot gas is given a circular or cyclonic type motion. The atomizer 52 sprays the fluid to be spray dried downwardly into the hot rotating gas in conical drying chamber 50 and the volatile portions of the particles are evaporated and pass outwardly through the gas exhaust outlet 54 at the top of conical drying chamber 50. Atomizer 52 is connected to a source of atomizing fluid such as air compressor 55 by pipe 56 and to a source 59 of the liquid product to be dried by piping 57 through a low pressure fluid pump 58. The unevaporated or solid portion of the product falls to the bottom of conical drying chamber 50, where it is removed through outlet 60.

It will be seen that the present invention provides a new and improved method for the spray drying of liquid products. The method utilizes a relatively low-pressure spraying means which prepares a dried product which retains important properties of the liquid form, such as, for example, the cooking properties. The method is advantageously applied to many liquid products. It has been found particularly beneficial in the preparation of powdered albumen or egg white. Known drying methods for such products produce a powdered albumen which requires six minutes for proper whipping in the preparation of an angel cake, while the spray drying process of the present invention produces powdered egg albumen which can be whipped to the desired consistency in one-half this time and which also produces a cake of about twenty-five percent greater volume. An improved two-fluid atomizer or nozzle is disclosed which, while operating at a pressure sufficiently low to prevent denaturization, at the same time provides a large volume spray of controlled spray droplet size for quick drying under controlled conditions. Such a spray is one in which the liquid product is atomized into particles of a predetermined small size and in which the spray pattern has a wide distribution. An improved nozzle connection for the two-fluid atomizer is disclosed in which the second or atomizing fluid is used to provide a heat insulator for the liquid product inlet so that heat may be applied at the atomizer without damaging or coagulating the liquid product in the feed pipes or in the atomizer itself.

As various changes may be made without departing from the spirit and scope of the invention and without sacrificing any of its advantages, it is to be understood that all matter herein is to be interpreted as illustrative and not in a limiting sense.

Having thus described my invention, I claim:

1. A method of preparing a powdered egg albumen from fluid egg albumen while preserving the natural characteristics of the egg albumen which comprises atomizing the fluid egg albumen by mixing an atomizing gas with the fluid albumen and by spraying the mixture under pressure into a hot gaseous medium, and maintaining the pressure of the atomizing gas and the pressure of the fluid egg albumen at less than 100 p.s.i.

2. A method of preparing a powdered egg albumen from fluid egg albumen while preserving the natural characteristics of the egg albumen which comprises atomizing the fluid egg albumen into uniformly sized particles by mixing the fluid egg albumen with an atomizing gas and by spraying the mixture under pressure into a hot gaseous medium, maintaining the pressure of the atomizing gas between seven and fifteen p.s.i., and maintaining the pressure of the fluid egg albumen at about seven p.s.i.

3. A method of preparing a powdered egg albumen from fluid egg albumen while preserving the natural characteristics of the egg albumen which comprises atomizing the fluid egg albumen into uniformly sized particles by mixing an atomizing gas with the fluid albumen and by spraying the mixture under pressure into a hot ga